US 10,259,190 B2

United States Patent
Camp (10) Patent No.: US 10,259,190 B2
(45) Date of Patent: Apr. 16, 2019

(54) MOLDABLE COMPOSITE MAT

(71) Applicant: FREUDENBERG PERFORMANCE MATERIALS LP, Durham, NC (US)

(72) Inventor: Eric L. Camp, Auburn Hills, MI (US)

(73) Assignee: FREUDENBERG PERFORMANCE MATERIALS LP, Durham, NC (US)

( * ) Notice: Subject to any disclaimer, the term of this patent is extended or adjusted under 35 U.S.C. 154(b) by 704 days.

(21) Appl. No.: 14/674,215

(22) Filed: Mar. 31, 2015

(65) Prior Publication Data

US 2016/0288451 A1     Oct. 6, 2016

(51) Int. Cl.
| | |
|---|---|
| B32B 5/02 | (2006.01) |
| D04H 1/498 | (2012.01) |
| D04H 1/4374 | (2012.01) |
| B32B 5/06 | (2006.01) |
| B32B 5/26 | (2006.01) |
| D04H 1/435 | (2012.01) |
| D04H 1/55 | (2012.01) |
| D04H 3/011 | (2012.01) |
| D04H 3/14 | (2012.01) |
| B32B 5/08 | (2006.01) |
| B32B 38/00 | (2006.01) |

(52) U.S. Cl.
CPC ............ *B32B 5/022* (2013.01); *B32B 5/06* (2013.01); *B32B 5/08* (2013.01); *B32B 5/26* (2013.01); *D04H 1/435* (2013.01); *D04H 1/4374* (2013.01); *D04H 1/498* (2013.01); *D04H 1/55* (2013.01); *D04H 3/011* (2013.01); *D04H 3/14* (2013.01); *B32B 2038/008* (2013.01); *B32B 2250/03* (2013.01); *B32B 2250/20* (2013.01); *B32B 2260/021* (2013.01); *B32B 2260/046* (2013.01); *B32B 2262/023* (2013.01); *B32B 2262/0276* (2013.01); *B32B 2262/0284* (2013.01); *B32B 2262/12* (2013.01); *B32B 2305/20* (2013.01); *B32B 2305/28* (2013.01); *B32B 2307/306* (2013.01); *B32B 2307/554* (2013.01); *B32B 2307/718* (2013.01); *B32B 2307/732* (2013.01); *B32B 2605/00* (2013.01); *B32B 2607/00* (2013.01)

(58) Field of Classification Search
None
See application file for complete search history.

(56) References Cited

U.S. PATENT DOCUMENTS

| | | |
|---|---|---|
| 6,235,657 B1 | 5/2001 | Schoeps et al. |
| 7,445,084 B2 | 11/2008 | Berbner et al. |
| 7,757,809 B2 | 7/2010 | Pfaffelhuber et al. |

(Continued)

FOREIGN PATENT DOCUMENTS

| | | |
|---|---|---|
| EP | 0372572 | 6/1990 |
| EP | 1059159 | 12/2000 |
| JP | 2890555 | 5/1999 |

OTHER PUBLICATIONS

International Search Report and Written Opinion from related PCT Appln. No. PCT/US2016/020797 dated Jun. 9, 2016.

*Primary Examiner* — Shawn McKinnon
*Assistant Examiner* — Lashawnda T McKinnon
(74) *Attorney, Agent, or Firm* — Grossman, Tucker, Perreault & Pfleger, PLLC (57) ABSTRACT

The present disclosure is directed at a moldable layered structure that is particularly suited for vehicular underbody applications. The structure is generally comprised of at least one layer of needled staple polyester fibers and at least one layer of spunbond polyester fibers.

14 Claims, 3 Drawing Sheets

(56) References Cited

U.S. PATENT DOCUMENTS

| | | |
|---|---|---|
| 8,287,983 B2 | 10/2012 | Emirze et al. |
| 8,636,105 B2 | 1/2014 | Castagnetti et al. |
| 2002/0009936 A1 | 1/2002 | North et al. |
| 2009/0117804 A1 | 5/2009 | Emirze et al. |
| 2014/0097036 A1 | 4/2014 | Camp et al. |

MOLDABLE COMPOSITE MAT

FIELD OF THE INVENTION

The present invention is directed at a moldable layered structure that is particularly suited for vehicular underbody applications. The structure is generally comprised of at least one layer of needled staple fibers and at least one layer of spunbond fibers.

BACKGROUND

Vehicular underbody covers are generally understood as panels applied anywhere to the vehicle underbody to provide improved wear, abrasion resistance or aerodynamic performance on the outer surface which is exposed to the road and which may also provide acoustic or noise damping properties on an inner surface. Underbody covers or engine compartment covers are typically produced from glass-reinforced plastic material. The glass-reinforcement is introduced into a plastic matrix which is often times sourced from a polypropylene type resin. The covers may then be heated and shaped to provide a desired configuration for placement within a given vehicle.

SUMMARY

A method for forming a multilayer material and the multilayer material so formed, which is particularly suitable for vehicle underbody applications. The method includes providing a first non-woven layer of spunbond polyester wherein said polyester comprises at least 50% by weight of an ester of an aromatic carboxylic acid and the first layer is present at a thickness of 0.1 mm to 2.0 mm and at a basis weight in the range of 25 g/m$^2$ to 150 g/m$^2$. One then provides a second needled staple polyester fiber layer wherein the polyester comprises at least 50% by weight of an ester of an aromatic carboxylic acid at a thickness of 5.0 mm to 15.0 mm and a basis weight in the range of 400 g/m$^2$ to 1600 g/m$^2$ wherein the second needled staple polyester fiber layer includes binder polymeric material wherein the binder polymeric material has a melting point in the range of 90° C. to 200° C. One then provides a third non-woven layer of spunbond polyester wherein the polyester comprises at least 50% by weight of an ester of an aromatic carboxylic acid and the third layer is present at a thickness of 0.1 mm to 2.0 mm and at a basis weight in the range of 25 g/m$^2$ to 150 g/m$^2$. This is then followed by needling the first and third non-woven spunbond polyester layers into said second needled staple fiber layer and mechanically bonding said layers. This is then followed by heating and compressing all or a portion of the layered structure to form a final molded part suitable for use as a vehicle underbody cover.

The present disclosure also relates to a method for forming a multilayer material and the multilayer material so formed comprising providing a first non-woven layer of spunbond polyester wherein said polyester comprises at least 50% by weight of an ester of an aromatic carboxylic acid and said first layer is present at a thickness of 0.1 mm to 2.0 mm and a basis weight in the range of 25 g/m$^2$ to 150 g/m$^2$. One then provides a second needled staple polyester fiber layer wherein the polyester comprises at least 50% by weight of an ester of an aromatic carboxylic acid at a thickness of 5.0 mm to 15.0 mm and a basis weight in the range of 400 g/m$^2$ to 1600 g/m$^2$ wherein the second needled staple polyester fiber layer includes binder polymeric material wherein the binder polymeric material has a melting point in the range of 90° C. to 200° C. This is then followed by needling the first non-woven spunbond polyester layers into the second needled staple fiber layer and mechanically bonding the layers.

The present disclosure is also directed at a cover part for a vehicle comprising a needled staple polyester fiber layer comprising fibers having a length of 25.0 mm to 125.0 mm and at least one non-woven spunbond polyester layer on each side of the needled staple polyester fiber layer wherein the non-woven spunbond polyester layers are needled into the staple polyester fiber layer, wherein the staple polyester fiber layer includes a binder polymeric material having a melting point in the range of 90° C. to 200° C. and wherein the cover part has a thickness in the range of 5.2 mm to 19.0 mm.

The present disclosure is also directed at a cover part for a vehicle comprising a needled staple polyester fiber layer comprising fibers having a length of 25.0 mm to 125.0 mm and at least one non-woven spunbond polyester layer on one side of the needled staple polyester fiber layer wherein the non-woven spunbond polyester layer is needled into the staple polyester fiber layer, wherein the staple polyester fiber layer includes a binder polymeric material having a melting point in the range of 90° C. to 200° C. and wherein the cover part has a thickness in the range of 5.2 mm to 19.0 mm.

DETAILED DESCRIPTION

The present disclosure is directed at preparation of multi-layer moldable structure for vehicular underbody applications. The disclosure herein is therefore directed at the formation of the multi-layer structure moldable structure, methods for molding and converting such structure to a desired configuration for placement in a given vehicle, and the final molded shape as it may be formed by heating and pressure. The multi-layer moldable structure therefore provides a cover part for a vehicle, especially for the vehicle underbody, and in particular for a wheel well cover. As discussed more fully herein, the final moldable structure provides improved acoustical performance while maintaining mechanical properties targets (tensile strength, tear strength, flexural rigidity and tear force requirements) that are suitable for vehicular applications. More specifically, the underbody covers herein can be employed to prevent corrosion, enhance stone impact resistance as well as the aerodynamic performance of a passenger car.

Figure 1:
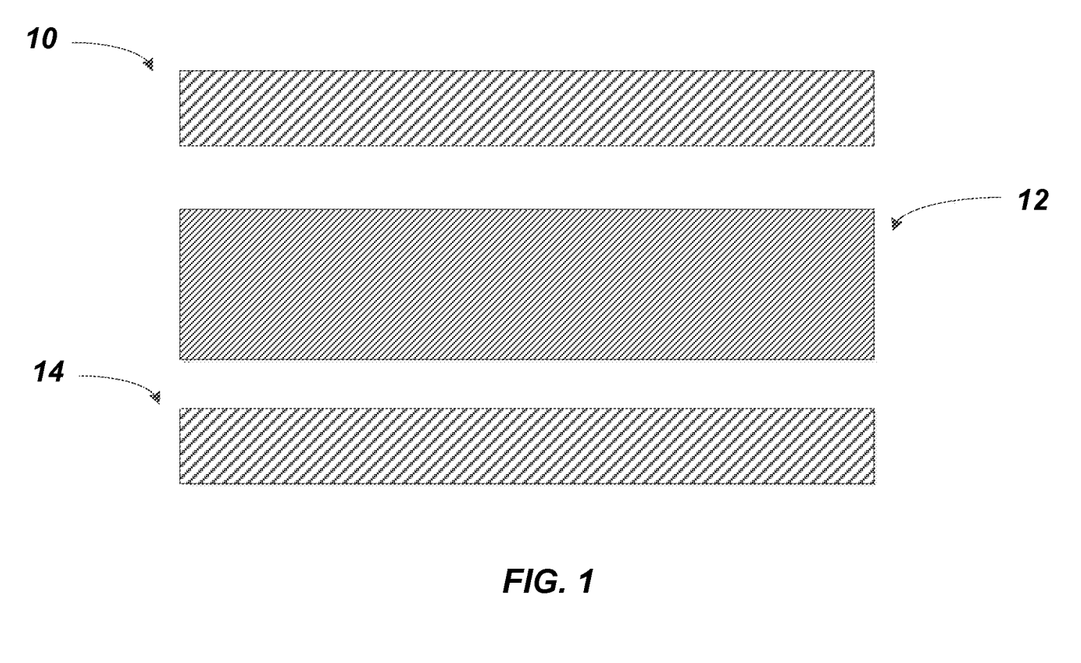
FIG. 1 illustrates the individual layers of a preferred three-layer moldable structure according to the present disclosure.

FIG. 1 illustrates the individual layers of the preferred three-layer moldable structure employed herein. Layers 10 and 14 are preferably selected as a non-woven spunbond layer, which may be understood as nonwoven fabric formed by filaments that have been extruded and laid as a web on a continuous belt. Bonding of the web is then preferably accomplished by several methods such as by hot-roll calendaring or by passing the web through a steam saturated chamber which may be at elevated pressure.

As discussed more fully herein, spunbond layer 10, which for the purpose of the present discussion may be assumed as that layer facing vehicle side, is optional. Accordingly, in the ensuing discussion, when layer 10 is mentioned, it is the context that if such layer is present, it will have the indicated characteristics. Accordingly, the thickness of the spunbond layer 10 (if present) and 14 preferably falls in the range of 0.1 mm to 2.0 mm, more preferably 0.5 mm to 1.5 mm at a basis weight in the range of 25 g/m$^2$ to 150 g/m$^2$, more preferably 40 g/m$^2$ to 120 g/m$^2$. The spunbond layers 10 (if present) and 14 are preferably sourced from a polyester which may be understood herein as a fiber in which the fiber forming substance is any synthetic polymer composed of at least 50% by weight of an ester of an aromatic carboxylic acid, including but not limited to terephthalic units ($-R-O-CO-C_6H_4-CO-O-)_x$ or parasubstituted hydroxybenzoate units ($-R-O-CO-C_6H_4-O-)_x$. Preferably, the polyester utilized herein is poly(ethylene terephthalate) or PET.

Expanding on the above, the spunbond layers 10 (if present) and 14 are such that they contain at least 60% by weight of an ester of an aromatic carboxylic acid, or at least 70% by weight of an ester of an aromatic carboxylic acid, or at least 80% by weight of an ester of an aromatic carboxylic acid, or at least 90% by weight of an ester of an aromatic carboxylic acid, or even 100% by weight of an ester of an aromatic carboxylic acid. It may be appreciated that by increasing the level of aromatic carboxylic acid in the polyester, one can selectively increase the heat resistance of the final molded structure, as may be dictated by the particular location that the vehicle cover may be placed on the vehicle underbody.

In addition, it should be noted that in certain embodiments, the basis weight of layer 10 (if present) is selected such that it is lower than the basis weight of layer 14. For example, the basis weight of layer 10 (if present) is preferably 1-80% lower in basis weight than layer 14. This can be desirable under circumstances where one desires relatively lighter overall weight of the final part and a cost reduction.

Layer 12, which may be understood as a core layer or middle layer in a preferred three-layer construction, and is preferably selected from a needled staple fiber mat. Reference to needled staple fiber may be understood as fibers having a length in the range of 25.0 mm to 125 mm, more preferably, a length of 50.0 mm to 105 mm. In addition, layer 12 preferably has a basis weight in the range of 400 g/m$^2$ to 1600 g/m$^2$ and is initially present at a thickness of 5.0 mm to 15.0 mm, more preferably in the range of 7.0 mm to 12.0 mm.

In addition, it is worth noting that middle layer 12 is preferably selected such that it contains only the preferred polyester component (at least 50% by weight of an ester of an aromatic carboxylic acid) and does not contain any separate and additional fiber reinforcement, such as glass fibers. Remarkably, however, the final molded part is still able to provide the mechanical strength and heat resistance requirements for vehicular applications. For example, the final molded part herein may be used proximate the exhaust system of the vehicle, where one must consider the relatively hot temperatures (~1400° F.) associated with exhaust system piping.

In addition, the middle layer, similar to the layers 10 and 12, may contain at least 60% by weight of an ester of an aromatic carboxylic acid, or at least 70% by weight of an ester of an aromatic carboxylic acid, or at least 80% by weight of an ester of an aromatic carboxylic acid, or at least 90% by weight of an ester of an aromatic carboxylic acid, or even 100% by weight of an ester of an aromatic carboxylic acid. It may again be appreciated that by increasing the level of aromatic carboxylic acid in the polyester of the middle layer, one can again selectively increase the heat resistance of the final molded structure.

Layer 12 may also be preferably selected from a polyester fiber having at least 50% by weight of an ester of an aromatic carboxylic acid as in the case of the spunbond layers 10 and 14. Accordingly, layer 12 may also be preferably selected from polyethylene terephthalate. The staple polyester fibers of layer 12 will also have a melting point (Tm) However, layer 12 also preferably contains polymeric binder which is heat activated and has a melting point that is lower than the staple polyester fibers and falls in the range of 90° C. to 200° C. The amount of binder polymeric material in layer 12 may comprise 30-70% by weight in said layer. As explained more fully herein, the binder polymer, which is later activated when processing the structure into its final configuration for use in a vehicle, is preferably selected with consideration of the ultimate heat resistance requirements when the molded structure is positioned as a vehicle underbody panel or wheel well cover. Accordingly, the Tm of the binder polymeric material may preferably fall in the range of 90° C. to 200° C., or 125° C. to 200° C., or 150° to 200° C., or 175° C. to 200° C.

Furthermore, the binder polymeric material may be preferably selected from monofilament fibers, wherein the monofilament fibers comprise one identifiable polymeric material having a desired melting point (Tm) that is less than the melting point of the polyester staple fibers forming layer 12. In addition, the binder polymeric material may be selected from a bicomponent fiber, which is to be understood herein as the characteristic where the fiber includes two different polymers (i.e. two polymers with different chemical composition and associated Tm values) within the same fiber filament. The bicomponent fibers herein may therefore assume a variety of geometric configurations, such as sheath/core, side-by-side, segmented pie structure or even island-in-the-sea fibers (areas of one polymer in a matrix of a second polymer, each with dissimilar melting points). Furthermore, the binder polymeric material may comprise a multicomponent fiber, which is to be understood as the characteristic where the fiber includes three or more polymers in the same fiber filament.

Preferably, the binder polymer herein is selected from a bicomponent fiber, wherein the first of the two polymers is a polyester as defined herein (at least 50% by weight of an ester of an aromatic carboxylic acid) having a melting point $Tm_1$ and the second of the two polymers is also a polyester of different composition as defined herein having a melting point $Tm_2$ wherein $Tm_1>Tm_2$. For example, in a preferred configuration as a sheath/core bicomponent fiber, the core is preferably composed of polyester having a Tm of >200° C. and the sheath is preferably composed of a polyester having a Tm of ≤200° C. One particularly preferred binder fiber comprises a sheath/core configuration wherein the core comprises PET having a Tm of about 250° C. and the sheath comprises a PET copolymer having a lower Tm in the range of 110° C. to 180° C.

After the layers 10, 12 and 14 are supplied as noted above, the next step is to bind the layers together which may be preferably achieved by needling the layers 10 and 14 into layer 12 to create entanglement and a mechanical bond. The resulting structure is shown in FIG. 2 wherein the preferred mechanical bond interface is shown generally at 16 and 18.

Other methods contemplated for bonding the layers include hydroentanglement. Again, in FIG. 2, it is understood herein that layer 10 is optional.

It should be noted that it has been found that for the downstream vehicular applications herein, the strength of this bond at interfaces 16 and 18 fall in the range of equal to or greater than 10 N, when the specimen is subject to 180° peel adhesion testing at a cross head speed of 125 millimeters per minute. As noted above, layers 10 (if present) and 14 may each have a thickness in the range of 0.1 mm to 2.0 mm and layer 12 may have a thickness of 5.0 mm to 15 mm. Accordingly, the overall thickness of the three-layer construction after needling of the layers will be on the order of 5.2 mm to 19 mm, as the needling itself has been found not to significantly alter the starting thickness of the individual layers. More preferably, the overall thickness of the three-layer construction will fall in the range of 8.0 mm to 14.0 mm, more preferably in the range of 9.0 mm to 12.0 mm.

Figure 2:
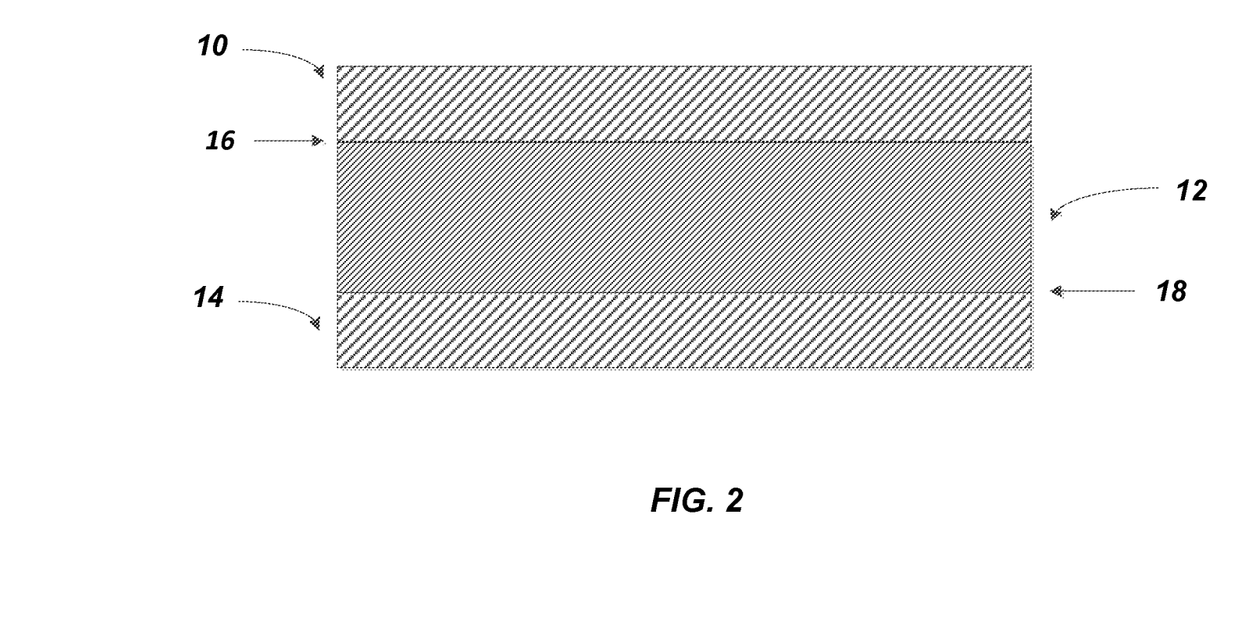
FIG. 2 illustrates the three-layer moldable structure of FIG. 1, after the outer layers have been needled into the middle layer to provide mechanical bonding.

After the preferred three-layer construction is formed as illustrated in FIG. 2, it is in condition for molding into a desired shaped for the particular vehicular underbody application at issue. Preferably, the layered construction is preheated at a temperature range of 200° F. to 300° F. which temperature is suitable to activate the selected polymeric binder. By activating the binder, it is understood that the binder polymer is heated to a temperature at or above its Tm. The layered construction is then placed in a compression mold which optionally may then compress all or a portion of the layered construction at a tonnage of up to 150 tons, or in the range of 30 tons to 300 tons. The layered construction may be allowed to remain in the mold at such pressure range for up to 1.0 minute, and more preferably in the range of 30-60 seconds. The now compressed layered construction is therefore allowed to cool (either in the mold or outside the mold) where the binder falls below Tm and the layered construction is now converted into its desired final shape for placement within the vehicle. Such layered construction may then also be trimmed as required, which may be achieved by mechanical methods or by the use of water jet or laser.

It should be noted, however, that the layer construction may be heated to activate the binder, and melt bond the layers together, without any compression. Accordingly, with regards to the preferred dimensions of the final part for placement in the vehicle, as noted above, the overall dimensions of the preferred three-layer construction illustrated in FIG. 2 may fall in the range of 5.2 mm to 19.0 mm. Accordingly, when there is no compression, and after heating to activate the binder, followed by cooling, and in the absence of compression, the final part may have a thickness that is also in the range of 5.2 mm to 19.0 mm. However, if one utilizes compression, the original overall thickness range of 5.2 mm to 19.0 mm is preferably reduced to an overall thickness of 1.0 mm to 12.0 mm.

Figure 3:
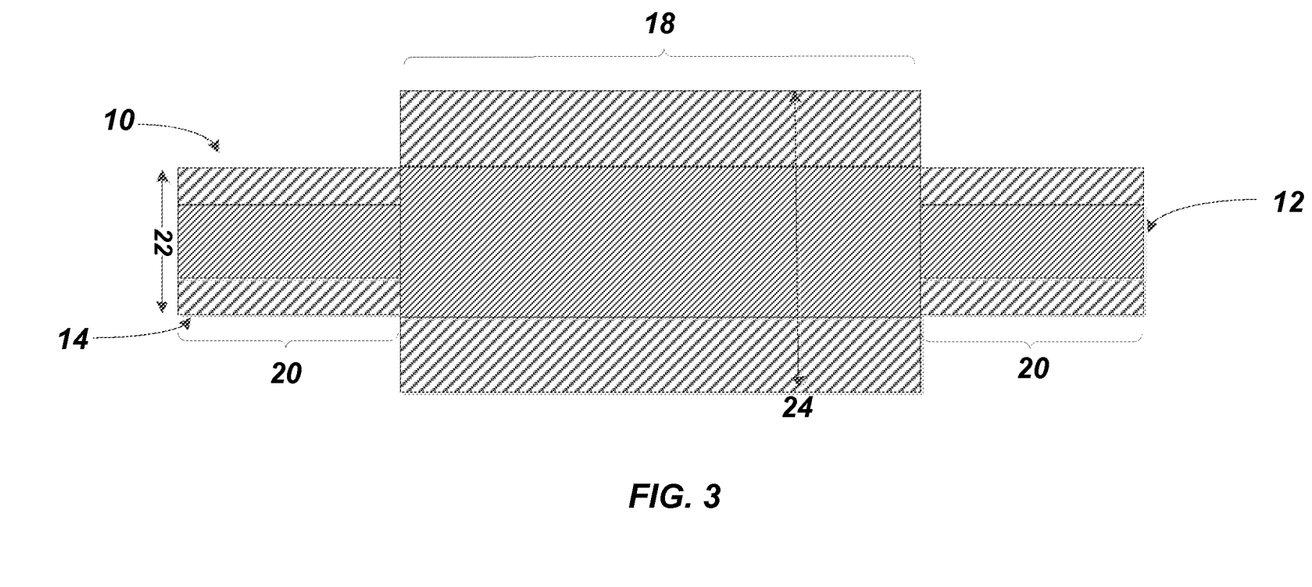
FIG. 3 illustrates the structure of FIG. 2 after compression molding, wherein the perimeter regions have been specifically compressed to a desired thickness relative to the central portion.

In addition, as alluded to above, when heat and compression are employed, it may be selectively applied to, e.g., the edge portions of the preferred three-layer construction identified in FIG. 2. In such a situation, the outer perimeter of such construction may be selective pressed such that the perimeter has a thickness that is less than a center portion. This option is illustrated in FIG. 3 where outer edge portions 20 are shown as having been compressed wherein the central portion 18 remains of its original dimensions, or where central portion 18 is not compressed to the same level as the outer edge 20. As may be appreciated, this allows for the formation of an outer perimeter portion 18 that will have relatively higher mechanical strength than the center portion 18. Such edge portion may therefore have a higher tensile strength (ASTM D5034) of 250 N/cm$^2$ to 1200 N/cm$^2$, tear strength (ISO 9073-4) of 250 N to 350 N, flexural rigidity (ISO170 178) or tear force (Bolt Pull Through) of 250 N to 850N. The Bolt Pull Through test is a test that replicates the force required to tear various materials at their attachment point. The test proceeds as follows: (1) sample rectangles are cut from the material in the front to rear vehicle direction at a size of 50 mm wide×100 mm long; (2) a 10 mm×12 mm oval is punched centered in the 50 mm width direction. The oval is located 8 mm from the front edge; (3) the samples are then clamped in the base of the Instron equipment; (4) a 6 mm bolt (¼" bolt will suffice) is then located through the oval and hooked to the top of the Instron equipment via wires on each side of the bolt; (5) the Instron is then run at a speed of 50 mm/min; (6) record the force (N) at which the material finally tore/gave.

For example, the edge portion 20 may preferably have a thickness as illustrated by arrow 22 of 1.0-3.5 mm. The central portion 18 may preferably have a thickness as illustrated by arrow 24 that falls in the range of greater than 3.5 mm to 12.0 mm.

As alluded to above, one of the features of the layered construction herein is that the respective layers are all preferably sourced from a polyester fiber, which as noted amounts to the presence of a fiber containing at least 50% by weight or more of an ester of an aromatic carboxylic acid. One advantage of this construction is that such common feature of having polyester polymer present in all of the layers is that the product herein is now more suitable for recycling. For example, it is contemplated that the final product herein, comprising a vehicular underbody cover, may be recycled by grinding the product and subjecting the formed granulate to further melt processing, such as extrusion or injection molding. Given that the layers are all preferably thermoplastic, and that no glass fibers or other non-melting components are preferably eliminated, and that all of the layers share the feature of containing polyester type fiber composition, the ensuing recycled product is contemplated to have improved compatibility and mechanical strength in recycled form. Reference to improved compatibility may be understood as providing, e.g. a common continuous phase of polyester in the recycled product, which may then impart improved mechanical properties. The improved recyclability is contemplated to reach a high level of efficiency, when, e.g., layers 10 and 14 are sourced only from spunbond PET and layer 12 is sourced only from PET needled staple fiber mater, wherein the needle staple fiber mat includes, as a binder, a PET copolymer. More specifically, the PET copolymer includes first PET repeating units along with a second repeating unit, also of polyester polymer, where the second repeating unit serves to reduce the overall melting to 150-200° C. Accordingly, such layered construction is particularly suitable for recycling, as discussed herein.

Attention is directed to Table 1 below, which provides an evaluation of the mechanical properties of the layered construction as described herein.

TABLE 1

|  |  |  | Control | 800 (2.5 mm) | 800 (5.5 mm) | 1200 (3.5 mm) | 1200 (7.0 mm) | 1200-1 (3.5 mm) |
|---|---|---|---|---|---|---|---|---|
| Tensile Strength | ASTM-D5034 | Peak Load (N) | 3189 | 3132 | 3168 | 2702 | 2247 | 2472 |
| Tensile Strength | ASTM-D5034 | Tensile Strength (N/cm) | 318.9 | 313.2 | 316.8 | 1080.8 | 898.8 | 988.8 |
| Tear Strength | ISO 9073-4 | Tear Strength (N) | 184 | 314 | 703 | 342 | 2834 | 298 |
| Flexural Rigidity | ISO 178 | Flexural Rigidity (N) | 23.155 | 18.089 | 18.965 | 62.501 | 32.015 | 52.179 |
| Tear Force | Bolt Pull Through | Tear Force (N) | 341.91 | 286.67 | 506.43 | 798.56 | 747.11 | 611.16 |

In Table 1, the Control was a 2.89 mm thick single-layer needled PET mat comprised of 50% PET fiber and 50% PET bicomponent fiber, wherein the bicomponent fiber was a PET core with a PET copolymer sheath with a melting point in the range of 90° C. to 200° C.

Reference to "800(2.5 mm)" amounts to a layered structure in accordance with the present disclosure, which comprised two outer layers of PET spunbond at basis weight of 90 g/m$^2$ and a middle layer of needled staple PET at a basis weight of 800 g/m$^2$ which had an initial overall thickness of 7.0 mm, and which was then compression molded to a final thickness of 2.5 mm. The binder was a bicomponent fiber with a PET core with a PET copolymer sheath with a melting point in the range of 90° C. to 200° C. and present at a level of 50% by weight in the middle layer.

Reference to "800(5.5 mm)" amounts to a layered structure in accordance with the present disclosure, which comprised two outer layers of PET spunbond at basis weight of 90 g/m$^2$ and a middle layer of needled staple PET at a basis weight of 800 g/m$^2$ which had an initial overall thickness of 7.0 mm, and which was then compression molded to a final thickness of 5.5 mm. The binder was a bicomponent fiber with a PET core with a PET copolymer sheath with a melting point in the range of 90° C. to 200° C. and present at a level of 50% by weight in the middle layer.

Reference to "1200(3.5 mm)" amounts to a layered structure in accordance with the present disclosure, which comprised two outer layers of PET spunbond at basis weight of 90 g/m$^2$ and a middle layer of needled staple PET at a basis weight of 1200 g/m$^2$ which had an initial overall thickness of 11.0-12.0 mm and which was then compression molded to a final thickness of 3.5 mm. The binder was a bicomponent fiber with a PET core with a PET copolymer sheath with a melting point in the range of 90° C. to 200° C. and present at a level of 50% by weight in the middle layer.

Reference to "1200(3.5 mm)" amounts to a layered structure in accordance with the present disclosure, which comprised two outer layers of PET spunbond at basis weight of 90 g/m$^2$ and a middle layer of needled staple PET at a basis weight of 1200 g/m$^2$ which had an initial overall thickness of 11.0-12.0 mm and which was then compression molded to a final thickness of 3.5 mm. The binder was a bicomponent fiber with a PET core with a PET copolymer sheath with a melting point in the range of 90° C. to 200° C. and present at a level of 50% by weight in the middle layer.

Reference to "1200(7.0 mm)" amounts to a layered structure in accordance with the present disclosure, which comprised two outer layers of PET spunbond at basis weight of 90 g/m$^2$ and a middle layer of needled staple PET at a basis weight of 1200 g/m$^2$ which had an initial overall thickness of 11.0-12.0 mm and which was then compression molded to a final thickness of 7.0 mm. The binder was a bicomponent fiber with a PET core with a PET copolymer sheath with a melting point in the range of 90° C. to 200° C. and present at a level of 50% by weight in the middle layer.

Reference to "1200-1(3.5 mm)" amounts to a layered structure in accordance with the present disclosure, which comprised two outer layers of PET spunbond at basis weight of 90 g/m$^2$ and a middle layer of needled staple PET at a basis weight of 1200 g/m$^2$ which had an initial overall thickness of 11.0-12.0 mm and which was then compression molded to a final thickness of 3.5 mm. The binder was a bicomponent fiber with a PET core with a PET copolymer sheath with a melting point in the range of 90° C. to 200° C. and present at a level of 50% by weight in the middle layer.

As can be seen from Table 1, the results of the mechanical property testing confirm that the addition of continuous fiber outer layers (spunbond) greatly improves the force required to tear the multilayer molded material.

Attention is next directed to Table 2, which compares the acoustical performance of the indicated multilayer structures disclosed herein. More specifically, testing reported in Table 2 identifies the sound absorption coefficient for the indicated sample at the indicated thickness and frequency. A value of zero indicates perfect reflection. A value of 1 indicates perfect absorption. The test procedure following for this measurement was in accordance with the standard test method ASTM E1050-12, Impedance and Absorption of Acoustical Materials Using A Tube, Two Microphones and a Digital Frequency Analysis System. The measurements were made using a two-microphone impedance measurement tube. Plane waves were generated in the tube by a random noise source. The standing waves in the tube were measured at two fixed locations using wall mounted microphones. The signals from the microphones were sent to a dual channel signal analyzer to determine the complex acoustic transfer function and finally to compute the sound absorption coefficient using a software package. The samples were die cut to fit the large (100 mm diameter) and small (29 mm diameter) sample holder of the B&K type 4206 tube. The large tube as a measurement range of 96 Hz to 1696 Hz and overlaps the small tube range of 892 Hz to 6296 Hz. Tests were evaluated with no air space between the sample holder and sample holder back plate. Absorption coefficients were computed using constant frequency bandwidths of 2 Hz from 96 Hz to 1696 Hz (for the large tube)

and from 892 Hz to 6296 Hz (for the small tube). Three pieces of each sample were tested in the large tube and small tube.

Results of the testing are presented in Table 2 below. This shows the numerical listing of the average normal incidence sound absorption coefficients for the identified samples. The results are provided at each ⅓-octave band center frequency (OBCF).

TABLE 2

|  |  | Control | 90/ 800/90 | 90/800/90 | 90/ 1200/90 | 90/1200/90 |
|---|---|---|---|---|---|---|
| Thickness (mm) |  | 2.89 | 1.8 | 5.0 | 3.2 | 7.0 |
| Frequency (Hz) | 500 | 0.02 | 0.03 | 0.04 | 0.03 | 0.05 |
|  | 800 | 0.03 | 0.03 | 0.06 | 0.07 | 0.10 |
|  | 1000 | 0.03 | 0.04 | 0.08 | 0.09 | 0.14 |
|  | 1250 | 0.04 | 0.05 | 0.11 | 0.12 | 0.19 |
|  | 1600 | 0.06 | 0.07 | 0.15 | 0.17 | 0.26 |
|  | 2000 | 0.07 | 0.09 | 0.20 | 0.19 | 0.33 |
|  | 2500 | 0.09 | 0.10 | 0.27 | 0.22 | 0.41 |
|  | 3150 | 0.13 | 0.15 | 0.36 | 0.25 | 0.53 |
|  | 4000 | 0.20 | 0.25 | 0.50 | 0.28 | 0.66 |
|  | 5000 | 0.28 | 0.34 | 0.65 | 0.33 | 0.76 |
|  | 6300 | 0.35 | 0.40 | 0.75 | 0.38 | 0.81 |

In Table 2, the Control was a 2.89 mm thick single-layer needled PET mat comprised of 50% PET fiber and 50% PET bicomponent fiber, wherein the bicomponent fiber contained a PET core with a PET copolymer sheath with a melting point in the range of 90° C. to 200° C.

Reference to "90/800/90" at 1.8 mm, amounts to a layered structure in accordance with the present disclosure, which comprised two outer layers of PET spunbond at a basis weight of 90 g/m² and a middle layer of needled staple PET at a basis weight of 800 g/m², which had an initial overall thickness of 7.0 mm-10.0 mm and which was then compression molded to a final thickness of 1.8 mm. The binder was a bicomponent fiber with a PET core with a PET copolymer sheath with a melting point in the range of 90° C. to 200° C. and present at a level of 50% by weight in the middle layer.

Reference to "90/800/90" at 5.0 mm amounts to a layered structure in accordance with the present disclosure, which comprised two outer layers of PET spunbond at a basis weight of 90 g/m² and a middle layer of needled staple PET at a basis weight of 800 g/m², which had an initial overall thickness of 11.0 mm to 12.0 mm and which was then compression molded to a final thickness of 5.0 mm. The binder was a bicomponent fiber with a PET core with a PET copolymer sheath with a melting point in the range of 90° C. to 200° C. and present at a level of 50% by weight in the middle layer.

Reference to "90/1200/90" at 3.2 mm amounts to a layered structure in accordance with the present disclosure, which comprised two outer layers of PET spunbond at a basis weight of 90 g/m² and a middle layer of needled staple PET at a basis weight of 800 g/m², which had an initial overall thickness of 11.0 mm to 12.0 mm and which was then compression molded to a final thickness of 5.0 mm. The binder was a bicomponent fiber with a PET core with a PET copolymer sheath with a melting point in the range of 90° C. to 200° C. and present at a level of 50% by weight in the middle layer.

Reference to "90/1200/90" at 7.0 mm amounts to a layered structure in accordance with the present disclosure, which comprised two outer layers of PET spunbond at a basis weight of 90 g/m² and a middle layer of needled staple PET at a basis weight of 800 g/m², which had an initial overall thickness of 11.0 mm to 12.0 mm and which was then compression molded to a final thickness of 5.0 mm. The binder was a bicomponent fiber with a PET core with a PET copolymer sheath with a melting point in the range of 90° C. to 200° C. and present at a level of 50% by weight in the middle layer.

As can be seen from Table 2, the samples herein generally indicated a relatively higher sound absorption coefficient as compared to the control and in the range of between 0.04-0.81. These results confirm that the outer continuous filament layers (spunbond) provides a transmission loss barrier as the inner fine denier needled staple fiber provides a higher absorption coefficient.

What is claimed is:

1. A method for forming a multilayer material comprising:
   a. providing a first non-woven layer of spunbond polyester wherein said polyester comprises at least 50% by weight of an ester of an aromatic carboxylic acid and said first layer is present at a thickness of 0.1 mm to 2.0 mm and a basis weight in the range of 25 g/m² to 150 g/m²;
   b. providing a second needled staple polyester fiber layer wherein said polyester comprises at least 50% by weight of an ester of an aromatic carboxylic acid at a thickness of 5.0 mm to 15.0 mm and a basis weight in the range of 700 g/m² to 1600 g/m² wherein said second needled staple polyester fiber layer includes binder polymeric material wherein said binder polymeric material has a melting point in the range of 90° C. to 200° C.;
   c. providing a third non-woven layer of spunbond polyester wherein said polyester comprises at least 50% by weight of an ester of an aromatic carboxylic acid and said third layer is present at a thickness of 0.1 mm to 2.0 mm and a basis weight in the range of 25 g/m² to 150 g/m²;
   d. needling said first and third non-woven spunbond polyester layers into said second needled staple fiber layer and mechanically bonding said layers and heating and compressing along the edge portion to provide a reduced thickness of 1.0 mm to 12.0 mm having a tear strength of at least 250 N.

2. The method of claim 1 wherein said second needled stapled polyester fiber layer comprises fibers having a length in the range of 25.0 mm to 125.0 mm.

3. The method of claim 1 wherein said second needled staple polyester fibers have a melting point and said binder polymeric material comprises monofilament fibers comprising one identifiable polymeric material having a melting point that is less than said melting point of said staple polyester fibers.

4. The method of claim 1 wherein said binder polymeric material comprises bicomponent fiber containing two identifiable polymeric materials.

5. The method of claim 4 wherein said two identifiable polymeric materials comprise polyesters having at least 50% by weight of an ester of an aromatic carboxylic acid.

6. The method of claim 5 wherein one of said identifiable polymeric materials has a melting point (Tm1) and another of said identifiable polymeric material has a melting point (Tm2) wherein Tm1 is greater than Tm2.

7. The method of claim 6 wherein said bicomponent fiber has a sheath/core configuration and said core has said melting point Tm1 and said sheath has said melting point Tm2.

8. The method of claim 1 wherein said needled and mechanically bonded layered structure formed in step (d) is then heated to activate said binder polymeric material.

9. The method of claim 8 wherein said heated mechanically bonded layered structure is compressed along all or a portion thereof to a reduced thickness.

10. The method of claim 9 wherein the reduced thickness is in the range of 1.0 mm to 12.0 mm.

11. A method for forming a multilayer material comprising:
   a. providing a first non-woven layer of spunbond polyester wherein said polyester comprises at least 50% by weight of an ester of an aromatic carboxylic acid and said first layer is present at a thickness of 0.1 mm to 2.0 mm and a basis weight in the range of 25 g/m² to 150 g/m²;
   b. providing a second needled staple polyester fiber layer wherein said polyester comprises at least 50% by weight of an ester of an aromatic carboxylic acid at a thickness of 5.0 mm to 15.0 mm and a basis weight in the range of 400 g/m² to 1600 g/m² wherein said second needled staple polyester fiber layer includes binder polymeric material wherein said binder polymeric material has a melting point in the range of 90° C. to 200° C.;
   c. needling said first non-woven spunbond polyester layers into said second needled staple fiber layer and mechanically bonding said layers and heating and compressing along all or a portion thereof to provide a reduced thickness of 1.0 mm to 12.0 mm having a tear strength of at least 250 N.

12. The method of claim 1, wherein the first non-woven layer of spunbond polyester consists essentially of an ester of an aromatic carboxylic acid.

13. The method of claim 12, wherein the third non-woven layer of spunbond polyester consists essentially of an ester of an aromatic carboxylic acid.

14. The method of claim 11, wherein the first non-woven layer of spunbond polyester consists essentially of an ester of an aromatic carboxylic acid.

* * * * *